J. WILLMANN.
PROCESS OF MANUFACTURING ARTIFICIALLY SOURED MILK.
APPLICATION FILED AUG. 19, 1910.
1,025,772.
Patented May 7, 1912.
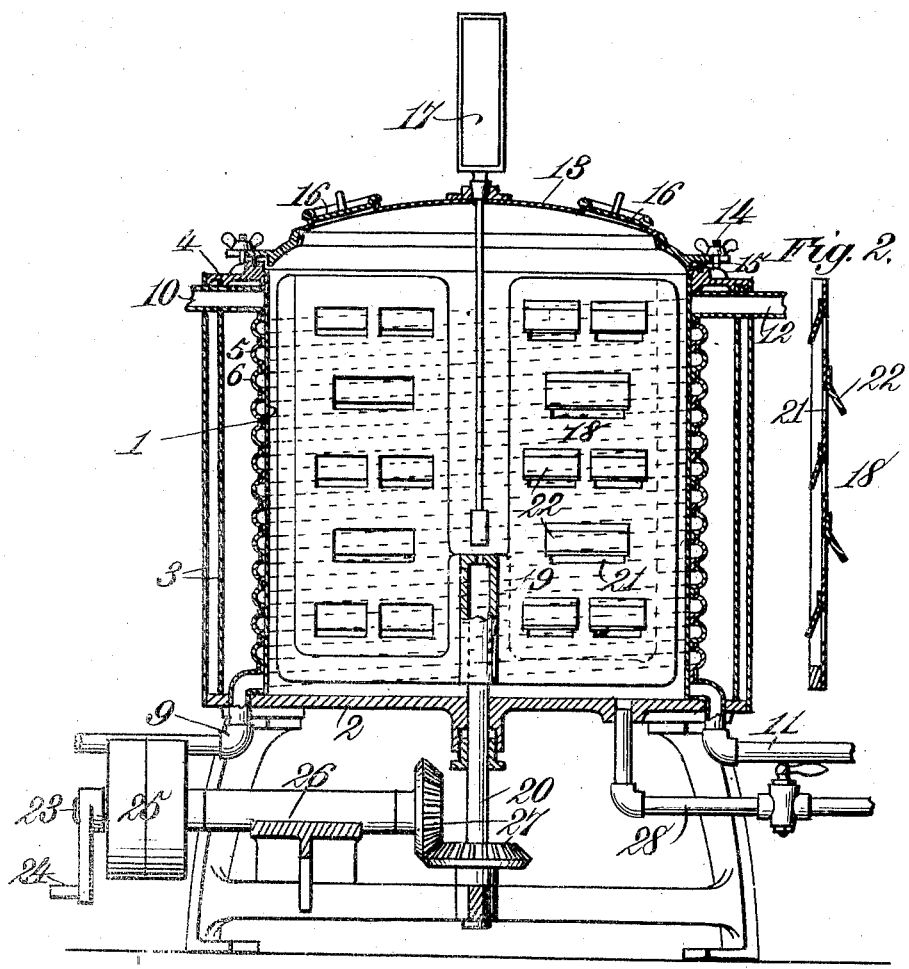

UNITED STATES PATENT OFFICE.

JOSEPH WILLMANN, OF DERBY, CONNECTICUT, ASSIGNOR TO DAIRY MACHINERY AND CONSTRUCTION COMPANY, INCORPORATED, OF DERBY, CONNECTICUT, A CORPORATION OF CONNECTICUT.

PROCESS OF MANUFACTURING ARTIFICIALLY-SOURED MILK.

1,025,772.     Specification of Letters Patent.     Patented May 7, 1912.

Original application filed July 17, 1909, Serial No. 508,156. Divided and this application filed August 19, 1910. Serial No. 577,999.

*To all whom it may concern:*

Be it known that I, JOSEPH WILLMANN, at present a subject of the Emperor of Germany, having announced my intention of becoming a citizen of the United States, residing at Derby, in the county of New Haven and State of Connecticut, have invented certain new and useful Improvements in Processes of Manufacturing Artificially-Soured Milk, of which the following is a specification.

My present invention provides a process of manufacturing artificially soured milk according to which the various steps in the manufacture of the product are carried on within a single receptacle or machine, uniformity in the product being thereby insured and the operation of the process is under complete control, there being no opportunity for the substance under treatment becoming contaminated from exterior sources and aseptic conditions are insured.

It has been known for many years that sour milk is of great therapeutic value and in recent years it has been recommended by the best authorities in the treatment of common intestinal diseases and also for the purpose of prolonging life, this being based essentially upon the theory that the lactic acid in the sour milk destroys putrefactive bacteria. Fermented milks have been made heretofore in a crude way. The present process, however, provides a mode of manufacturing artificially soured milk in a practical commercial way and which conforms to all scientific requirements.

My process consists briefly in placing the milk into a receptacle, then pasteurizing the milk up to a temperature which will destroy all bacteria, except some of the spores, the milk being maintained at such temperature long enough to insure these results. After the milk has been pasteurized, it is cooled while it remains in such receptacle to incubating temperature or a temperature that is favorable to the growth of the cultures, the temperature varying between 70° and 105°, according to the product desired. While the milk is at such temperature, the pure culture is introduced and thoroughly mixed with the milk in the receptacle and the liquid in the receptacle is kept at the incubating temperature long enough to produce the desired degree of acidity which may vary between six-tenths and nine-tenths of one per cent. As soon as the acidity has developed to the desired degree, the curd is mechanically broken up without opening the receptacle or otherwise exposing and affecting the product, the product being then cooled to a sufficiently low temperature and the product is finally discharged from the receptacle by any suitable means.

Apparatus of various kinds may be used in carrying out my process. In the present instance I have shown an apparatus such as that disclosed in my Patent No. 969,018, granted August 30, 1910, as an example of one by the aid of which the process can be carried out advantageously. It will be understood, however, that the process is in no wise limited to any particular form of type of apparatus.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 represents a central vertical section of an apparatus capable of carrying out my improved process; Fig. 2 is a detail sectional view of the agitator; and Fig. 3 is a detail sectional view showing the manner in which the coils for the temperature-changing mediums are applied to the receptacle containing the liquid or substance under treatment.

Similar parts are designated by the same reference characters in the several views.

The apparatus shown comprises a chamber or receptacle having a wall 1 which is preferably cylindrical or annular the bottom of which is closed by a base plate 2 supported on legs or otherwise, and this chamber is preferably insulated from the atmosphere in a suitable manner, double walls 3 being shown in the present instance as surrounding the chamber but leaving an annular space at the exterior of the chamber, and the space between the double walls may be filled with asbestos or other suitable heat insulating material. These double walls may also be supported on the base plate 2, and a ring 4 is fitted tightly to the top edges of the double walls and to the upper edge of the wall 1 of the central chamber, this ring serving to retain the several walls in properly centered relation and closing the annular spaces formed between them. The wall 1 of the central chamber is preferably composed of material that will conduct heat readily and which will not be affected by the action of the substance under treatment, German silver or copper tinned being suitable for the purposes.

The substance under treatment is heated or pasteurized in the central chamber and then cooled and, to facilitate these operations, one or more coils preferably encircle the wall 1 of this chamber. In that form of apparatus shown, a double coil is employed consisting of two tubes 5 and 6 which are coiled helically and are arranged in alternate relation, the alternate disposition of the coils insuring uniform exposure of the wall 1 either to the heating or the cooling medium. In order to obtain a relatively high efficiency in the heating and cooling operations, each tube is in the form approximately of a semi-circle, that is to say, it is segmental and its edges are out-turned to form securing flanges which may be readily soldered or otherwise properly secured to the exterior surface of the wall 1 of the central chamber. It is preferable to overlap the lateral flange 7 of one tube with the adjacent flange 8 of the next tube, the overlapping of the flanges enabling a maximum number of convolutions to be applied to the exterior of the chamber. One of the tubes is provided with an inlet 9 for steam or other heating medium, an outlet 10 for the discharge of the steam or heating medium, the other tube having an inlet 11 for a cooling liquid such as brine, and an outlet 12 through which the cooling liquid is discharged, suitable valves being provided for controlling the introduction and discharge of the heating and cooling liquids with reference to the respective tubes or coils. In those cases where a single coil is used, suitable branch connections may be attached to the extremities of the coil and equipped with appropriate controlling valves for the heating and cooling mediums whereby the circulation of these mediums through the single coil may be controlled.

The top of the central chamber may be tightly closed by a cover 13 which may be detachably secured in position by means of clamping bolts 14 and a gasket 15 which may be interposed between the cover and the ring 4. Relatively smaller openings may be provided in the main cover through which the cultures may be introduced, suitable lids 16 being provided for such openings. A thermometer 17 is also shown as extending through the cover and having a bulb arranged in approximately the center of the chamber in which the substance is treated.

In order to suitably agitate the substance during its treatment so as to prevent either under-exposure or over-exposure to the heating or cooling medium and, moreover, to insure thorough mixture of the liquid whereby a uniform product may be obtained, I provide an agitator which consists in the present instance of a revoluble member having relatively flat blades or plates 18 which are connected toward their lower ends by a hub 19, the latter being splined to a vertical shaft 20 which passes upwardly through the base plate 2 and serves to impart the necessary motion to the agitator, a stuffing-box being provided to prevent leakage of the liquid through the base plate. Each blade or plate is provided with a number of suitably located openings 21, they being preferably arranged in staggered relation on each plate, and a series of vanes or deflectors 22 are provided one for each opening, these vanes being secured to the plate above the top edge of each opening and are inclined downwardly at a suitable angle so as to deflect the liquid flowing through these openings. The vanes are preferably applied alternately to the opposite sides of the blade or plate whereby a turning movement of the agitator will cause the liquid to flow downwardly through certain openings and upwardly through the remaining openings, the result being that a thorough mixing action of the liquid is produced.

In practice, it is preferable to provide for a combined movement of the agitator, that is to say, during one part of the operation it may be preferable to oscillate or reciprocate the agitator while during another part of the operation it may be desirable or necessary to revolve it. For this purpose, I have shown in the present instance one form of driving means which is capable of producing this result, it consisting in the instance shown of a shaft 23 having a crank 24 and also one or more pulleys 25 thereon, the crank being adapted to receive a reciprocating link whereby the agitator may be rocked to and fro, while to the pulley or pulleys 25 is applied a belt or other power transmitting device whereby a continuously rotating or revolving motion may be imparted to the agitator. The shaft 23 in the present instance is journaled in a bearing 26 suitably formed or arranged at the base of the apparatus, and bevel gearing 27 serves to operatively connect the shaft 23 to the agitator shaft 20. 28 represents a pipe through which the finished product may be withdrawn, a suitable valve being provided which is normally closed during the operation of the apparatus.

The process may be performed with the aid of the above-described apparatus, as follows: First, the milk is introduced into the central chamber of the apparatus and the agitator is set into operation, a reciprocating or rocking motion being preferably imparted thereto through the crank 24. Steam is then introduced into the appropriate coil or tubing, the milk being pasteurized at the desired temperature and may be held at this temperature for the desired period. As soon as this operation has been completed, the steam is cut off from the apparatus and the cooling medium is introduced therein, the liquid contained in the central chamber being cooled to an incubating temperature, say, for example, of about 98° F. The pure culture of souring organisms is now introduced through the small openings in the cover of the apparatus and the liquid in the central chamber is preferably maintained at, say, a temperature of approximately 98° for a period sufficient to develop the desired amount of acidity. When this has been accomplished, the cooling medium is again introduced into the apparatus and the liquid is reduced in temperature to a point as near as possible to the freezing point. During the latter part of the operation, the agitator may be either rocked to and fro, or it may be completely revolved through the pulley 25 and by keeping the liquid in a constant state of agitation during the treatment, thickening of the liquid is prevented, the curd is broken up, and it will be found that the product will flow from the apparatus and that it will be uniform in quality.

The present process is described in Letters Patent, #969,018 granted to me August 30, 1910. This process is not claimed in said prior patent but is claimed in the present application which is a division thereof.

I claim as my invention:—

1. A process of making artificially soured milk which consists in pasteurizing milk, cooling the same to a temperature favorable to the growth of cultures, introducing cultures of souring organisms into the milk, maintaining the liquid at substantially such temperature for a period sufficient to produce the desired degree of acidity in the liquid agitating the substance, and immediately cooling the product, the foregoing steps being all performed while the liquid is kept free from exterior contamination.

2. A process of manufacturing artificially soured milk which consists in pasteurizing milk, cooling the milk to incubating temperature, introducing to and mixing cultures with the milk at such temperature, maintaining the substance at substantially such temperature for a period sufficient to produce the desired degree of acidity, agitating the substance to break up the curd, and then immediately cooling the product, all the above-mentioned steps of the process being performed while the liquid is contained in one receptacle and is kept free of contamination from exterior sources.

In testimony whereof I have hereunto set my hand in presence of two subscribing witnesses.

JOSEPH WILLMANN.

Witnesses:
 HOWARD B. PECK,
 CHAS. H. HALL.